United States Patent
Ogg

(10) Patent No.: US 8,805,749 B2
(45) Date of Patent: Aug. 12, 2014

(54) SYSTEM AND METHOD FOR CONTROLLING POSTAGE USAGE INDEPENDENT OF METER BALANCE

(75) Inventor: Craig Ogg, Long Beach, CA (US)

(73) Assignee: Stamps.com, El Segundo, CA (US)

( * ) Notice: Subject to any disclaimer, the term of this patent is extended or adjusted under 35 U.S.C. 154(b) by 357 days.

(21) Appl. No.: 13/309,787

(22) Filed: Dec. 2, 2011

(65) Prior Publication Data

US 2012/0078962 A1    Mar. 29, 2012

Related U.S. Application Data

(63) Continuation of application No. 10/679,861, filed on Oct. 6, 2003, now Pat. No. 8,078,548.

(51) Int. Cl.
*G06Q 99/00* (2006.01)

(52) U.S. Cl.
USPC ........................... 705/401; 705/410; 705/400

(58) Field of Classification Search
USPC .......................................... 705/401, 400, 410
See application file for complete search history.

(56) References Cited

U.S. PATENT DOCUMENTS

| | | | |
|---|---|---|---|
| 5,715,164 A * | 2/1998 | Liechti et al. ................. | 705/410 |
| 5,742,683 A * | 4/1998 | Lee et al. ........................ | 705/60 |
| 6,073,125 A | 6/2000 | Cordery et al. | |
| 6,939,062 B2 | 9/2005 | Ogg et al. | |
| 7,043,053 B1 | 5/2006 | Patton et al. | |
| 7,127,434 B2 | 10/2006 | Burningham | |
| 2001/0037320 A1 | 11/2001 | Allport et al. | |
| 2002/0026430 A1 | 2/2002 | Ryan, Jr. | |
| 2003/0140017 A1 | 7/2003 | Patton et al. | |
| 2003/0144972 A1 * | 7/2003 | Cordery et al. ................ | 705/401 |
| 2004/0098354 A1 * | 5/2004 | Manduley ...................... | 705/401 |
| 2004/0194154 A1 | 9/2004 | Meadors et al. | |
| 2005/0080751 A1 | 4/2005 | Burningham | |
| 2005/0192912 A1 | 9/2005 | Bator et al. | |

FOREIGN PATENT DOCUMENTS

| | | | |
|---|---|---|---|
| EP | 926632 A2 | | 6/1999 |
| EP | 926632 A2 * | | 6/1999 |

OTHER PUBLICATIONS

U.S. Appl. No. 10/606,579, Ogg.
U.S. Appl. No. 10/643,745, Ogg.
U.S. Appl. No. 10/677,619, Ogg.
U.S. Appl. No. 10/677,829, Ogg.
"Information-Based Indicia Program (IBIP): Performance Criteria for Information-Based Indicia and Security Architecture for Open IBI Postage Evidencing Systems," Feb. 23, 2000, The United States Postal Service (USPS), 80 pages.

* cited by examiner

*Primary Examiner* — Akiba Allen
(74) *Attorney, Agent, or Firm* — Fulbright & Jaworski LLP

(57) ABSTRACT

A postage evidencing meter system is disclosed. The system comprises an authorization database for storing parameters for at least one user, wherein the parameters limit the at least one user's ability to evidence postage using the meter. The parameters include a maximum postage amount that the at least one user is allowed to use on the meter to evidence postage. The parameters may alternatively or also include a period of time during which the user is allowed to use the meter to evidence postage or a maximum amount of postage that can be used during a period of time. The postage evidencing meter further comprises a user interface, a printer, and a security module. In alternative embodiments, the authorization database is stored on a removable storage device and/or is coupled to the meter via a communication link to a remote postage information system.

31 Claims, 3 Drawing Sheets

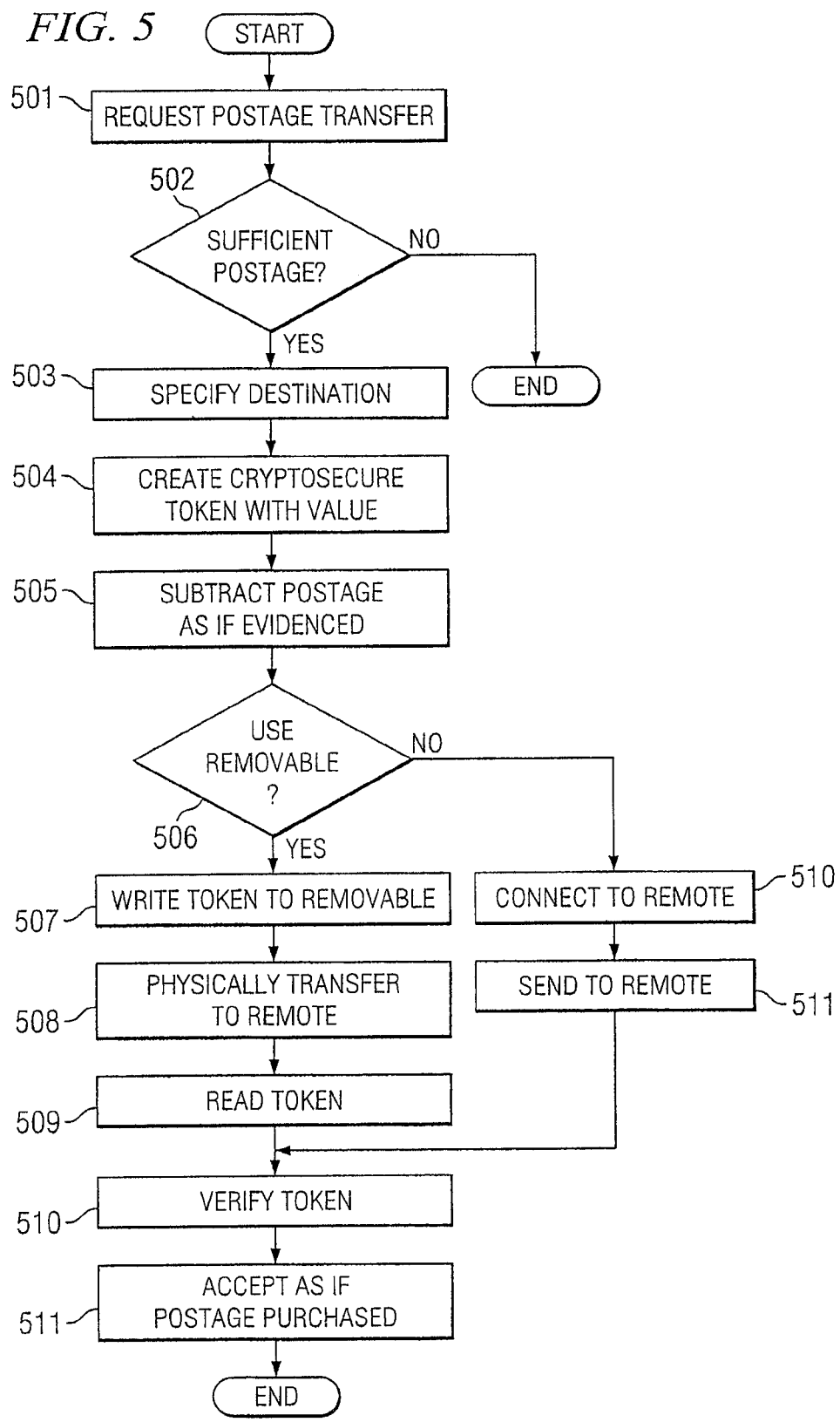

SYSTEM AND METHOD FOR CONTROLLING POSTAGE USAGE INDEPENDENT OF METER BALANCE

CROSS-REFERENCE TO RELATED APPLICATIONS

The present application is a continuation of co-pending, commonly assigned, patent application Ser. No. 10/679,861 entitled "SYSTEM AND METHOD FOR CONTROLLING POSTAGE USAGE INDEPENDENT OF METER BALANCE," filed Oct. 6, 2003 and is related to co-pending U.S. patent application Ser. No. 10/606,579, entitled "SYSTEM AND METHOD FOR AUTOMATICALLY PROCESSING MAIL," filed Jun. 26, 2003; co-pending U.S. patent application Ser. No. 10/643,745, entitled "SYSTEM AND METHOD FOR DYNAMICALLY PARTITIONING A POSTAGE EVIDENCING METER," filed Aug. 19, 2003; co-pending U.S. patent application Ser. No. 10/677,619, entitled "SYSTEM AND METHOD FOR HIGH-SPEED POSTAGE APPLICATION MANAGEMENT," filed Oct. 2, 2003; and co-pending U.S. patent application Ser. No. 10/677,829, entitled "SYSTEM AND METHOD FOR ACCESSING A REMOTE POSTAGE METER ACCOUNT FROM A DEVICE THAT HAS A DEDICATED LOCAL METER AND ACCOUNT," filed Oct. 2, 2003, the disclosures of which are hereby incorporated by reference.

TECHNICAL FIELD

The present invention relates to postage usage and, more specifically, to controlling postage usage independent of a meter balance.

BACKGROUND OF THE INVENTION

The only limit on the amount of postage that can be evidenced using current postage meters is the amount of postage that is currently deposited in the meter. If that meter is shared, there is no way to limit the amount of postage evidenced by any one user. For example, in environments where meters are shared, such as a workplace, the amount of postage on deposit in the meter is the only limit on how much postage individuals can print. This offers limited control on postage usage and postage expenses cannot be managed effectively. A business or individual may desire to limit the amount of postage that can be used for a specific purpose or used by each individual.

For example, a company's policy might permit employees to use the company's postage meter for personal purposes. This arrangement is typically not problematic if employees mail only one or two pieces of personal mail in a week. However, there is a risk that some employees will abuse the system by processing a large volume of mail. A company may have a relatively high limit on their postage use, and an unscrupulous employee would be able to take advantage of the system without detection. The problem is compounded when multiple meters are available within a facility or a company. A company may have a combination of mechanical meters and online meters. An employee intending to abuse such a system would have several options for printing postage, and it is unlikely that the employee will be caught by the employer. It would be advantageous to have the capability of controlling postage use in order to prevent misuse.

It would also be advantageous if companies could control the use of postage by other parties. For example, at times, companies need to authorize other parties to print postage on the company's behalf In one case, a third party, such as a print shop, letter facility, or high-speed mail facility, may be asked to prepare mail at its own facility on behalf of the company. The company is then billed for the amount of postage used.

As another example, a catalog company that pays for customers' postage for returned item to the company have to deal with a customer reimbursement policy or other process. It would be preferable instead to be able to authorize an individual, such as a customer, to print the required postage amount to pay for shipping an item back to the company.

BRIEF SUMMARY OF THE INVENTION

The present invention is directed to a system and method that controls postage usage independent of a meter balance. A user can set meter limits for individuals or entities. These limits may be set for a selected period of time or on a one-time-use basis. The meter allows an individual to print a set dollar amount of postage per week or per month, independent of the meter's postage balance. Accordingly, employees would not be allowed to evidence postage if they have exceeded their threshold amounts for the specified period or if there is insufficient money available on the meter balance to perform the postage transaction.

Additional embodiments of the invention allow the user to grant authorizations on a one-time basis to outside service bureaus, for example, to print a set dollar amount of postage on the user's behalf. This avoids the need to be reimbursed for postage costs at a later time. As an alternative embodiment, the present invention allows postage to be transferred among meters within a given entity as a method of controlling postage outside of a meter balance.

One embodiment of the invention is directed to a postage evidencing meter comprising an authorization database for storing parameters for at least one user, wherein the parameters limit the at least one user's ability to evidence postage using the meter. The parameters include a maximum postage amount that the at least one user is allowed to use on the meter to evidence postage. The parameters may alternatively or also include a period of time during which the user is allowed to use the meter to evidence postage. The postage evidencing meter further comprises a user interface, a printer, and a security module. In alternative embodiments, the authorization database is stored on a removable storage device and/or is coupled to the meter via a communication link to a remote postage information system.

In another embodiment of the invention a system for controlling postage usage comprises one or more postage evidencing meters having a communication module for providing a communication link between the postage evidencing meter and a postage information system, wherein the postage evidencing meter includes a database for storing postage usage parameters for at least one user, wherein the parameters limit the at least one user's ability to evidence postage using the meter. The parameters include a maximum postage amount that the at least one user is allowed to use on the meter to evidence postage and/or a period of time during which the user is allowed to use the meter to evidence postage and/or an amount of postage that the user can use over a period of time (for example, $10 per week). The communication link in the system may be a wireless link or a wireline link. The postage evidencing meters further comprise a removable storage device for storing postage usage parameters for at least one user, wherein the parameters limit the at least one user's ability to evidence postage using the meter.

In other embodiments of the invention, a system for controlling postage usage, comprises at least two postage evidencing meters, each meter having a processor and a communication module for providing a communication link between the at least two meters, wherein postage usage parameters for at least one user are exchanged between meters via the communication link, and wherein the parameters control the at least one user's ability to evidence postage using the meters. The parameters include a maximum postage amount that the at least one user is allowed to use on the meter to evidence postage and/or a period of time during which the user is allowed to use the meter to evidence postage and/or an amount of postage that the user can use over a period of time. The communication link is a wireless link or a wireline link. The communication link is used to transfer postage values securely between the at least two meters using cryptographic techniques. In other embodiments, the exchange of postage usage parameters is bi-directional.

In a further embodiment of the invention, a method for transferring postage value between postage evidencing devices comprises receiving a request for a postage value transfer, the request identifying a destination device and an amount of postage value to be transferred, creating a postage value token at a first postage evidencing device, subtracting the postage value amount from registers in the first postage evidencing device, transferring the postage value token to a second postage evidencing device, verifying the postage value token at the second postage evidencing device, and adding the postage value to registers at the second postage evidencing device.

The method for transferring postage value may further comprise transferring the postage value using a communications link between the first and second postage evidencing devices. The communication link may be a wireless link or a wireline link. The method for transferring postage value further comprises transferring the postage value using a removable storage device. The postage value token is a cryptographically secure token in some embodiments.

Embodiments of the invention also include a method for controlling postage usage comprising receiving a request to evidence postage from a selected user, determining if sufficient postage is available to fulfill the request for the selected user and if the user has not exceeded his or her postage usage limit, determining if the request is received in an approved time period for the selected user, evidencing a requested postage amount, and recording postage usage for the selected user. The method may further comprises receiving a request to use the postage account of a selected user, and authenticating the selected user. Additionally, the method may comprise receiving a request to configure parameters for the selected user, and modifying postage usage limits for the selected user. In alternative embodiments, the usage limits are selected from the group consisting of: a maximum amount of postage that can be evidenced for the user, a time period during which the user is authorized to evidence postage, a class of postage that the user is authorized to evidence, and an amount of postage that the user can use per period of time. The method further comprises receiving a request to purchase postage for the selected user, and adding a purchased postage value to the meter balance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 5 is a flowchart illustrating a process for using a postage evidencing devices according to the embodiments illustrated in FIG. 4.

DETAILED DESCRIPTION OF THE INVENTION

Figure 1:
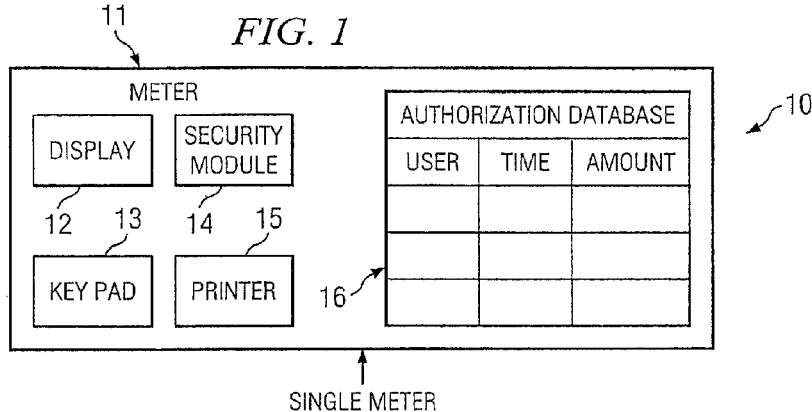
FIG. 1 is a block diagram of a postage meter incorporating embodiments of the invention.

FIG. 1 is a block diagram of postage meter 11 incorporating embodiments of the invention. Display 12 and keypad 13 allow users to interact with meter 11, such as to select an amount and class of postage to be evidenced. Security module 14 controls access to meter 11 so that only an authorized person adjusts the amount of postage available on the meter. Printer 15 is used to evidence postage on mail pieces.

Meter 11 also includes authorization database 16, which maintains records about individual users and the amount of postage that each individual user is allowed to print over a specified time frame. This specific time frame could be daily, weekly, monthly, or any other time period that has been authorized by the system manager. A user may be limited to printing a certain amount of postage over the selected period of time, such as during certain hours on work days or certain days of the week.

Alternatively, authorization database 16 specifies a onetime fixed amount of postage that each individual user is not allowed to exceed. Accordingly, authorization database 16 maintains a record of the postage amounts used by each individual user over the specified time period. Authorization database 16 may also maintain a authorization list of the operations that each individual user is allowed to perform, such as evidencing a particular number of mail pieces, particular classes of mail pieces, and the like.

Figure 2:
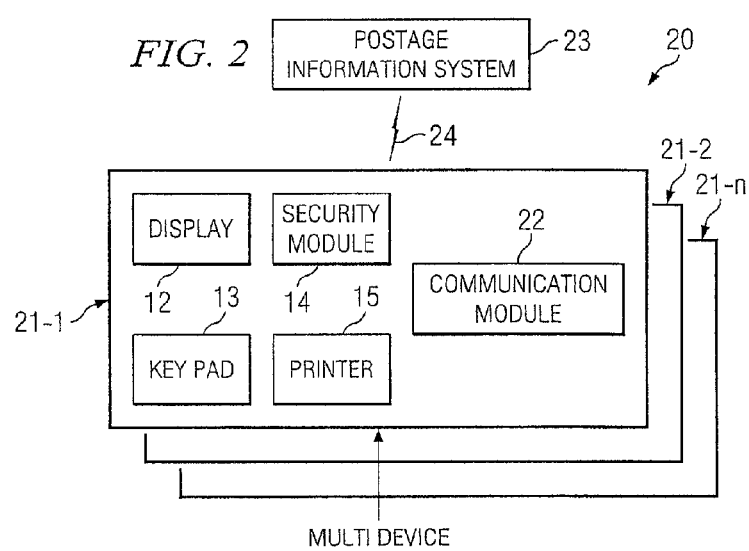
FIG. 2 is a block diagram of postage meters incorporating alternative embodiments of the present invention.

FIG. 2 is a block diagram of postage meters incorporating alternative embodiments of the present invention. System 20 includes multiple postage meters 21-1 to 21-N. Meters 21 are similar to meter 11 (FIG. 1), but authorization database 16 is replaced with communication module 22 in each meter 21. Communication module 22 communicates with external postage information system 23, which maintains the authorization information for each meter 21. The information maintained in postage information system 23 is the same information that was stored in authorization database 16, such as records about individual users and the amount of postage that each individual user is allowed to print over a specified time frame.

Postage information system 23 provides a central database for tracking the postage amounts used by each individual user and for maintaining a list of the operations that each individual user is allowed to perform. Meters 21 communicate with postage information system 23 via connection 24, which may be any wireline or wireless connection, such as a direct cable connection, local area network (LAN), wide area network (WAN), intranet, the Internet, or the like using any protocol now known or later developed that provides for the transmission of data between two or more devices.

Figure 3:
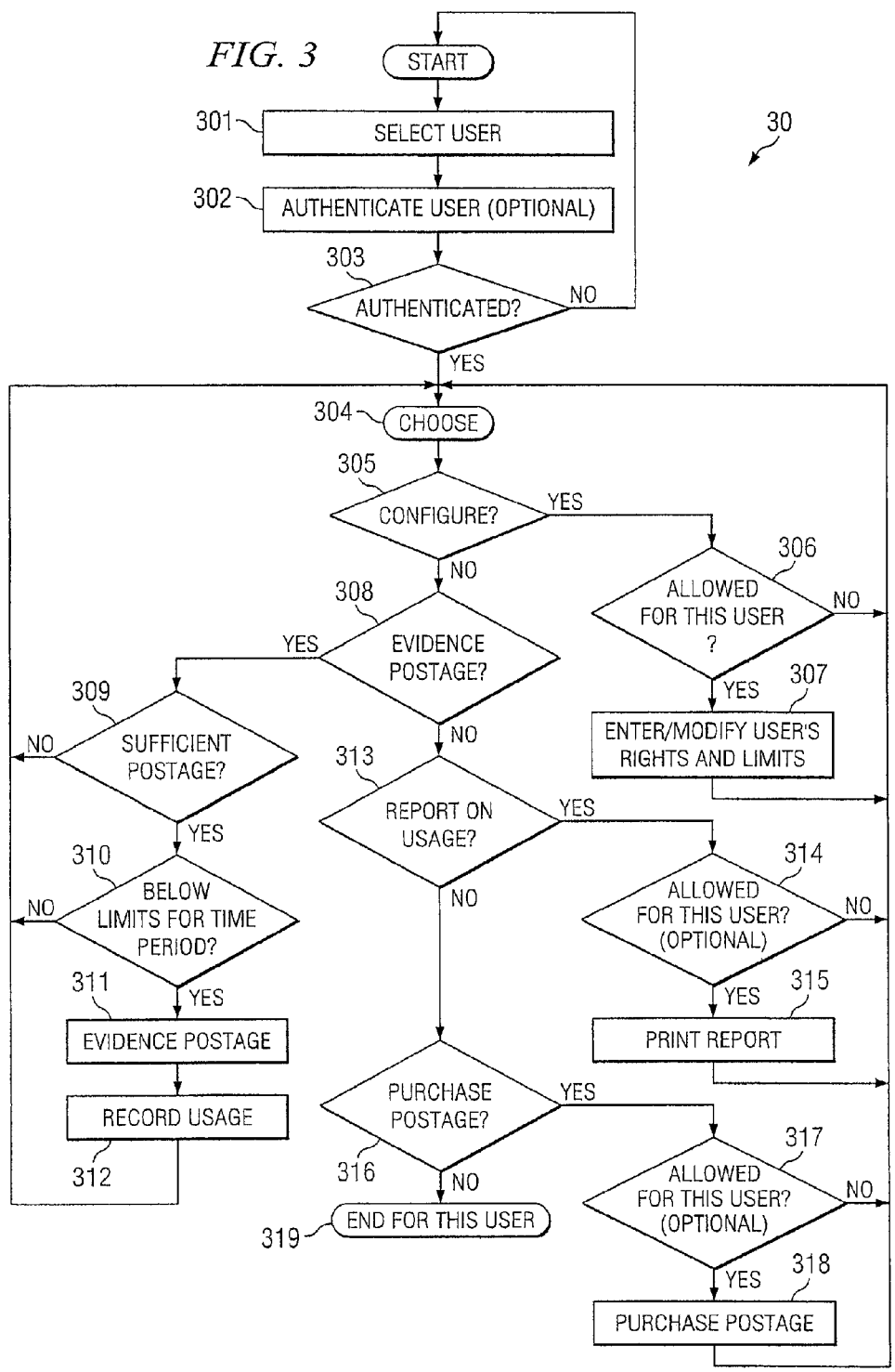
FIG. 3 is a flowchart illustrating a process for using a postage evidencing device according to embodiments of the present invention.

FIG. 3 is a flowchart illustrating process 30 for using a postage evidencing device according to embodiments of the present invention. A user is selected at 301 and is authenticated at 302. If the authentication was not correct, then at 303 the process returns to the start to reattempt the authentication. If the authentication was successful, then process 30 moves to 304, where the user is allowed to choose a desired operation.

At 305, the user can choose to configure the meter or system. If the configure option is selected at 305, then the process moves to 306 where the process determines if the user is authorized to configure the meter or system. The authorization check may be accomplished, for example, by checking if the selected user is on a list of users approved to configure the meter or system. If the user is not authorized to configure the meter or system, then process 30 returns to 304 and the user can select another operation. If the user is allowed to configure the meter or system, then at 307 the user enters modifications to the system configuration. For example, the user may adjust the access parameters for himself or any other user, including the amount of postage that particular users are allowed to evidence and an associated period of time within which the user can print that postage. The user is returned to 304 after configuring the system.

If the user does not configure the system at 305, then at 308 the user can choose to evidence postage. When the user chooses to print postage, then the system determines whether the user has enough postage at 309. If the user's account does not have sufficient postage, then the process returns to 304 to allow the user to make another selection. If the user has sufficient postage in his account, then at 310 the system checks whether the user is authorized to evidence postage at the current time or if the user has exceeded a limit on the amount of postage that he is authorized to print over a period of time. If the user is not authorized to use the meter at this time or has exceed the amount of postage that he is authorized to use during the current time period, then the process returns to 304. If the user has sufficient postage available and is within the authorized time period, then at 311 the postage is evidenced and the meter usage is recorded and the user's data is updated at 312 before returning to 304.

If the user does not want to evidence postage at 308, then at 313 the user is can choose to receive a report on meter usage. Reports may include items such as a list of authorized users and postage amounts and times of authorized use as well as a record of past meter use. If the user selects to run a report, then authorization is checked at 314. If not authorized, then the process returns to 304. If the user is authorized to run a report, then that report can be printed at 315 before returning to 304.

If the user does not run a report at 313, then the purchase postage option is available at 316. If the user chooses to purchase postage for the shared meter balance, authorization is checked at 317. Unauthorized users are returned to 304. Authorized users may purchase postage at 318 before returning to 304. If the user does not choose to purchase postage at 316, then process 30 ends at 319.

Figure 4:
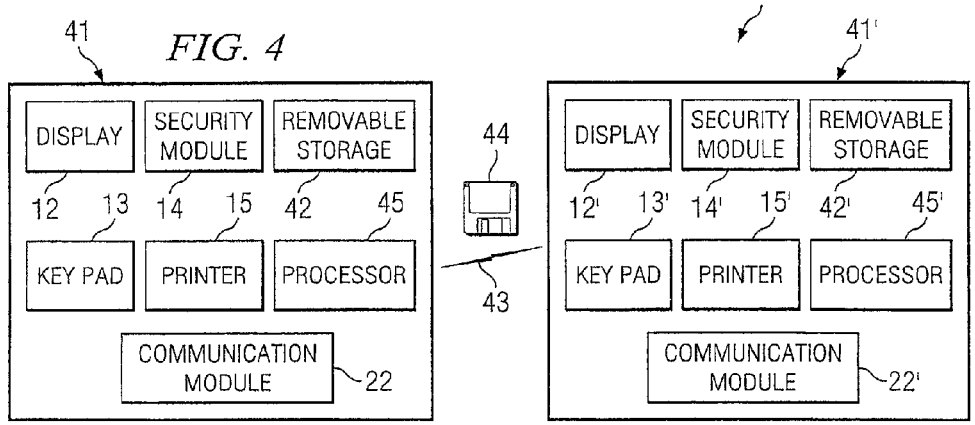
FIG. 4 is a block diagram of postage meters incorporating alternative embodiments of the present invention.

FIG. 4 is a block diagram of postage meters 41, 41' incorporating alternative embodiments of the present invention. System 40 depicts two meters 41, 41' that are similar to meter 11 (FIG. 1) and meter 21 (FIG. 2). Meter 41' includes the same components as meter 41. Accordingly, the discussion of the components of meter 41 will apply to both meters. Meter 41 includes communication module 22. This allows meters 41 and 41' to communicate with each other via connection 43, which may be any wireline or wireless connection, such as a direct cable connection, local area network (LAN), wide area network (WAN), intranet, the Internet, or the like using any protocol now known or later developed that provides for the transmission of data between two or more devices.

Meter 41 and 41' also include removable storage drive 42. Removable storage drive 42 is a device capable of receiving removable storage 44, such as a floppy disk, removable hard drive, a SMARTMEDIA™ flash memory card, a COMPACTFLASH® card, a MEMORY STICK® card, a SD SECURED DIGITAL® memory card, or the like. Removable storage 44 acts like authentication database 16 (FIG. 1) and provides a database for tracking the postage amounts used by one or more individual users and for maintaining a list of the operations that each individual user is allowed to perform. Before evidencing postage using meter 41, the meter checks removable storage device 44 to determine if the user is authorized to print postage. In an office or company environment with multiple postage meters, a user may carry removable storage device 44 so that he can access available postage meters as the need occurs.

Removable storage 44, or communications transfer over link 43, is used to securely transfer postage values from meter 41 to remote meter 41' using, for example, cryptographic techniques. The transfer between meter 41 to meter 41' can be bi-directional so that unused postage could be returned back to meter 41, or postage from remote meter 41' could be transferred into meter 41.

Meters 41 and 41' also include processor 45 which controls data transfers between meters 41 and 41' and also handles the control of other components within meter 41, 41'. Processor 45 holds the authorization data for users and determines whether a user is authorized to evidence a selected postage amount at a particular time. When the authorization data is transferred via communications link 43 or removable storage device 44 to remote meter 41', then processor 45' holds the data and determines whether the user is authorized to use meter 41'.

The use of multiple meters is not limited to a transfer between meter 41 and meter 41'. Any compatible meter can transfer postage in this fashion. Accordingly, meters 41 and 41' can be located on the same premises or on remote premises anywhere in the world.

FIG. 5 is a flowchart illustrating a process for using a postage evidencing devices according to the embodiments illustrated in FIG. 4. A postage transfer request is made at 501. At 502, the process determines whether there is sufficient postage to fulfill that transfer. If the available postage is not sufficient, then the user's session terminates.

If there is sufficient postage, then the user specifies a destination for the postage transfer at 503. A cryptographically secure token is created at 504. The token has the value for the postage to be transferred. At 505, postage is subtracted from the registers of the initiating meter as if postage was evidenced by the meter. At 506, the process decides whether to use removable media or the communication module to perform the token transfer.

If removable media is used, then the token is written to the removable media at 507. The token is physically transferred on the removable storage to the remote meter in process 508. The token is then read and loaded into the remote meter at 509. If the user decides not to use the removable media at 506, then the transfer will be made using the communication module. At 510 a connection is established to the remote meter using the communication module. The token is transferred to the remote system at 511 over a communication link, such as link 43 (FIG. 4).

At 510 the transferred token, whether received by physical transfer on a removable disk or by communication link, is verified. This ensures that the token has not been tampered with or used before. At 511, if the token passes verification, the system accepts the token as if the postage was purchased and the meter registers are adjusted to show the new postage amount. After proper adjustments have been made, user's postage transfer session is concluded and the postage is available for use on the remote meter.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of transferring a user parameter between value indicium evidencing devices comprising:
    accepting, at a first value indicium evidencing device, a user parameter transferred from a second value indicium evidencing device, wherein said user parameter controls said user's ability to evidence value indicium independent of an account balance of said first value indicium evidencing device; and
    authenticating, at said first value indicium evidencing device, said user based on login information;
    receiving, at said first value indicium evidencing device, a request from said user, wherein said request is a request to evidence value indicium;
    controlling, by said first value indicium evidencing device, said user's ability to evidence value indicium based on said accepted user parameter.

2. A method of claim 1 further comprising:
    receiving, at said first value indicium evidencing device, an amount of value transferred from said second value indicium evidencing device; and
    adding said amount of value to said account balance of said first value indicium evidencing device.

3. The method of claim 1 wherein said controlling is further based on said account balance of said first value indicium evidencing device.

4. The method of claim 1 wherein said user parameter comprises a maximum amount of value that said user is allowed to evidence.

5. The method of claim 1 wherein said user parameter comprises a period of time during which said user is allowed to evidence value.

6. The method of claim 1 wherein said user parameter comprises a maximum amount of value that said user is allowed to evidence during a period of time.

7. The method of claim 1 wherein said value indicium is postage.

8. The method of claim 1 wherein communication between said first value indicium evidencing device and said second value indicium evidencing device is bi-directional.

9. A method of transferring a user parameter between value indicium evidencing devices comprising:
    receiving, at a first value indicium evidencing device, a request to transfer a user parameter of a user to a second value indicium evidencing device, wherein said user's ability use said first value indicium evidencing device is limited at least by (a) authorization of said user's login information, (b) an account balance of said first value indicium evidencing meter, and (c) said user parameter, wherein said user parameter controls said user's ability to evidence value indicium independent of said account balance of said first value indicium evidencing meter; and
    transferring by said first value indicium evidencing device said user parameter to said second value indicium evidencing device, wherein after said transferring, said user's ability use said second value indicium evidencing device is limited at least by (a) authorization of said user's login information, (b) an account balance of said second value indicium evidencing meter, and (c) said user parameter, wherein said user parameter controls said user's ability to evidence value indicium independent of said account balance of said second value indicium evidencing meter.

10. The method of claim 9 further comprising:
    receiving, at said first value indicium evidencing device, a second request, wherein said second request is a request to send an amount of value to said second value indicium evidencing device; and
    sending said amount of value to said second value evidencing device, wherein said amount of value is added to said account balance of said second value indicium evidencing device.

11. The method of claim 10 wherein said sending comprises:
    creating a token comprising said amount of value; and
    sending said token, wherein said token is verified before said amount of value is added to said account balance of said second value indicium evidencing device.

12. The method of claim 9 wherein said user parameter comprises a maximum amount of value that said user is allowed to evidence.

13. The method of claim 9 wherein said user parameter comprises a period of time during which said user is allowed to evidence value.

14. The method of claim 9 wherein said user parameter comprises a plurality of controls on said user's ability to evidence value.

15. The method of claim 14 wherein said user parameter comprises a maximum amount of value that said user is allowed to evidence during a period of time.

16. The method of claim 9 wherein said value indicium is postage.

17. A system comprising:
  a first value indicium evidencing device comprising an account balance;
  a user login, wherein said first value indicium evidencing device is operable to authenticate a user based on said user login;
  a user parameter, received by said first value indicium device from a second value indicium device, wherein said user parameter controls said user's ability to evidence value indicium independent of said account balance, wherein said user's ability to use said first value indicium evidencing device is limited by said user parameter, said authentication, and said account balance.

18. The system of claim 17 further comprising:
  a value amount transfer, wherein said value amount transfer is received at said first value indicium evidencing device from a second value indicium evidencing device.

19. The system of claim 18 wherein said value amount transfer comprises a verifiable token, wherein said token is verified before value from said value amount transfer is added to said account balance.

20. The system of claim 17 wherein said user parameter comprises at least one of:
  a maximum amount of value that said user is allowed to evidence; and
  a period of time during which said user is allowed to evidence value.

21. The system of claim 17 wherein said value indicium is postage.

22. The system of claim 17 wherein said first value indicium evidencing device is operable send a second user parameter and a second value amount transfer to said second value indicium evidencing device.

23. A system comprising:
  a first value indicium evidencing device comprising an account balance and a user parameter, wherein said user parameter controls a user's ability to evidence postage independent of said account balance, and wherein said user's ability to use said first value indicium evidencing device is limited based on said account balance, said user's login information, and said user parameter;
  a request to transfer said user parameter to a second value indicium evidencing device;
  a module, operable to cause said first value indicium evidencing device to transfer said user parameter to said second value indicium evidencing device, wherein after said transfer, said user parameter controls a user's ability to evidence postage independent of said a second account balance of said second value indicium evidencing device, and wherein said user's ability to use said second value indicium evidencing device is limited based on said second account balance, said user's login information, and said user parameter.

24. The system of claim 23 further comprising:
  a second request to transfer an amount of value of said account balance,
  wherein said module is operable to subtract said amount of value from said account balance and send said amount of value to said second value indicium evidencing device.

25. The system of claim 23 wherein said user parameter comprises a maximum amount of value that said user is allowed to evidence.

26. The system of claim 23 wherein said user parameter comprises a period of time during which said user is allowed to evidence value.

27. The system of claim 23 wherein said user parameter comprises a plurality of controls on said user's ability to evidence value.

28. The system of claim 27 wherein said user parameter comprises a maximum amount of value that said user is allowed to evidence during a period of time.

29. The system of claim 23 wherein said value indicium is postage.

30. A system which transfers a user parameter between value indicium evidencing devices comprising:
  processor means for receiving a request to transfer a user parameter from a first value indicium evidencing device to a second value indicium evidencing device, wherein said user parameter controls a user's ability to evidence value indicium independent of an account balance of said first value indicium evidencing device; and
  processor means for transferring said user parameter to said second value indicium evidencing device, wherein after said transfer, said user parameter controls said user's ability to evidence value indicium independent of an account balance of said second value indicium evidencing device.

31. A system which transfers a user parameter between value indicium evidencing devices comprising:
  processor means for receiving a user parameter, at a first value indicium evidencing device from a second value indicium evidencing device, wherein said user parameter controls a user's ability to evidence value indicium independent of an account balance of said first value indicium evidencing device; and
  processor means for limiting said user's ability to use said first value indicium evidencing device based on said user's login information, further based on said account balance, and further based on said user parameter.

* * * * *